United States Patent [19]

Lehmann

[11] 4,102,025
[45] Jul. 25, 1978

[54] CONTROLLED DEFLECTION ROLL

[75] Inventor: Rolf Lehmann, Mutschellen, Switzerland

[73] Assignee: Escher Wyss Limited, Zurich, Switzerland

[21] Appl. No.: 770,783

[22] Filed: Feb. 22, 1977

[30] Foreign Application Priority Data

Feb. 26, 1976 [CH] Switzerland .................... 2359/76

[51] Int. Cl.² .............................................. B21B 13/02
[52] U.S. Cl. .............................................. 29/116 AD
[58] Field of Search ................... 29/116 AD, 113 AD; 92/167, 168

[56] References Cited

U.S. PATENT DOCUMENTS

| 2,360,735 | 10/1944 | Smith | 92/168 X |
| 3,549,154 | 12/1970 | Jones | 92/168 UX |
| 3,802,044 | 4/1974 | Spillmann et al. | 29/116 AD X |
| 3,994,367 | 11/1976 | Christ | 29/116 AD |

Primary Examiner—Alfred R. Guest
Attorney, Agent, or Firm—Pennie & Edmonds

[57] ABSTRACT

A controlled deflection roll is disclosed comprising a roll shell rotatable about a stationary beam and at least one hydrostatic support element therebetween. The support element is in the form of a piston tiltably guided in a cylindrical bore formed in the beam and the roll is provided with a seal for sealing off the intermediate space between the piston and the wall of the bore. The seal includes a sealing member disposed in a circumferential groove formed in the wall of the bore which is in seal-tight engagement with the piston and is support on at least one of its sides by an annular support member positioned in the groove and extending part way into the intermediate space.

6 Claims, 10 Drawing Figures

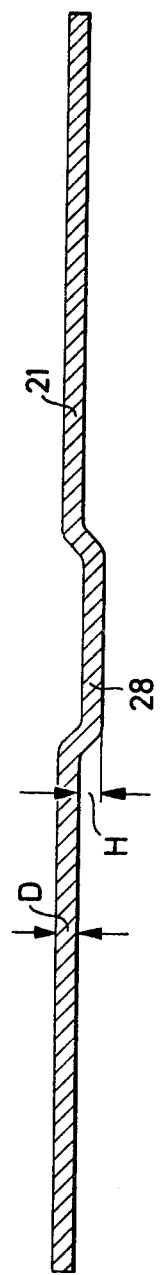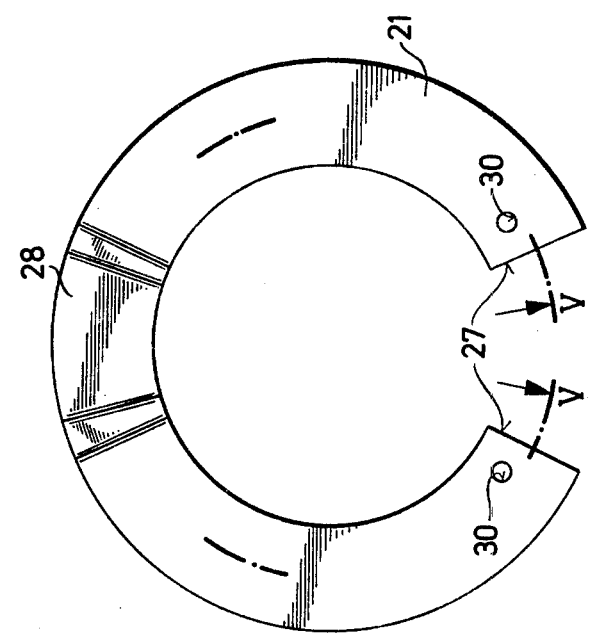
Fig. 5
Fig. 4

4,102,025

CONTROLLED DEFLECTION ROLL

BACKGROUND OF THE INVENTION

1. Field of the Invention

The present invention pertains to controlled deflection press rolls.

2. Description of the Prior Art

Controlled deflection rolls have been heretofore proposed, for example, in U.S. Pat. No. 3,802,044. The controlled deflection roll disclosed in that patent comprises a stationary beam and a roll shell rotatably mounted about the beam. The roll shell is supported on hydrostatic support elements in the form of pistons which are tiltably guided in seal-tight relationship in bores formed in the bean and exert forces against the interior of the shell upon the introduction of hydralic fluid into the bores. As shown in FIG. 5 of the cited patent, the seal for sealing off the space between the piston and the wall of the bore or cylinder is disposed in a groove formed in an annular member which is affixed to the beam and surrounds the piston cylinder. The annular member is shaped in paraboloid form so that it permits the support element to tilt with respect to the axis of the bore. A roll of this construction is, of course, relatively expensive to produce. Although an attempt has also been made to form the spherical shape required for supporting the seal directly in the wall of the bore, such a construction is complicated and it is more expensive to machine a bore of that configuration than a smooth bore. I have invented a controlled deflection roll in which it is considerably cheaper to produce the bores and seals with the additional advantage in that the seal supporting parts subject to wear are inexpensive and readily interchangeable.

SUMMARY OF THE INVENTION

In accordance with the invention, the controlled deflection roll compriss a fixed support beam, a roll shell rotatably mounted about the beam and at least one hydrostatic support element having a cylindrical portion tiltably guided in a cylindrical bore formed in the beam and a bearing surface adjacent the interior of the shell. The roll is provided with means for introducing fluid under pressure into the bore which acts on the end of the cylindrical portion of the support element causing it to exert stress on the roll shell. The roll is also provided with means for sealing off the intermediate space between the cylindrical portion of the support element and the wall of the bore which permits the support element to tilt with respect to the axis of the bore upon deflection of the beam during operation. The sealing means includes a sealing member disposed in a circumferential groove formed in the wall of the bore which is in seal-tight engagement with the cylindrical portion of the support element and at least one annular support member disposed in the groove and extending part way into the intermediate space for supporting at least one side of the sealing member against the forces exerted by the pressure fluid.

The annular support member or ring may be slotted so that it can be defomred during introduction into the groove. This construction thus provides a very simple and inexpensive to fabricate support for the seal. Advantageously, the ring is constructed so as to have a minimum gap in its expanded state when it is positioned in the groove. Two slotted support rings may also be used to provide a more rigid support for the seal, the two rings being positioned in the groove so that their respective slots are located at different positions along the periphery of the bore.

Preferably, the seal may include a set of two support rings disposed on at least one side of the sealing member, each of the rings being provided with a segmental cutout or slot at its periphery. In such an arrangement, at least one of the support rings is also provided with a projection which is of a height equal to the thickness of the other support ring and is configured to fit into the cutout of the other ring. The rings are installed into the groove in the wall of the bore in superposed relationship with the projection of one ring fitting into the cutout in the other to form a flat support surface for the sealing member. This construction provides a very rigid support for the seal and, in addition, the projection and the cutout prevent the two support rings from turning or twisting relatively to one another during operation.

The support ring may also be in the form of a coil formed by two turns of a flat metal strip. The turns lie flatly one upon the other when the support ring is positioned in the groove and the transition from one turn to the other is in the form of a step which is positioned at the slot-like gap between the two ends of the ring. This arrangement is also of a simple construction and provides a flat support surface for the seal of the required rigidity. An additional advantage of such a support ring made from a single metal strip is that since it is in one piece, it cannot be incorrectly assembled or mounted in the groove.

Advantageously, a support ring or a pair of support rings may be provided on both sides of the sealing member. In such an arrangement, the force exerted on the seal by the pressure fluid is taken up by the support ring or rings on the side of the sealing member adjacent the bearing surface of the support element, and this support ring or rings is in turn supported by the shoulder of the groove. The support ring on the opposite side of the sealing member may therefore be made resilient in the direction of the axis of the bore in order to compensate for deviations in the width of the groove. This construction thus permits greater variations in the tolerances of the groove during production. The resilient support member in such a construction may be in the form of a frustoconical or a corrugated ring.

BRIEF DESCRIPTION OF THE DRAWINGS

Other objects, features, and advantages of the invention will be apparent from the following description thereof with reference to the accompanying drawings in which:

FIG. 4 is an elevation view of a support ring according to the invention;

FIG. 5 is a developed view of the support ring on line V—V of FIG. 4;

DETAILED DESCRIPTION OF THE PREFERRED EMBODIMENTS

Figure 1:
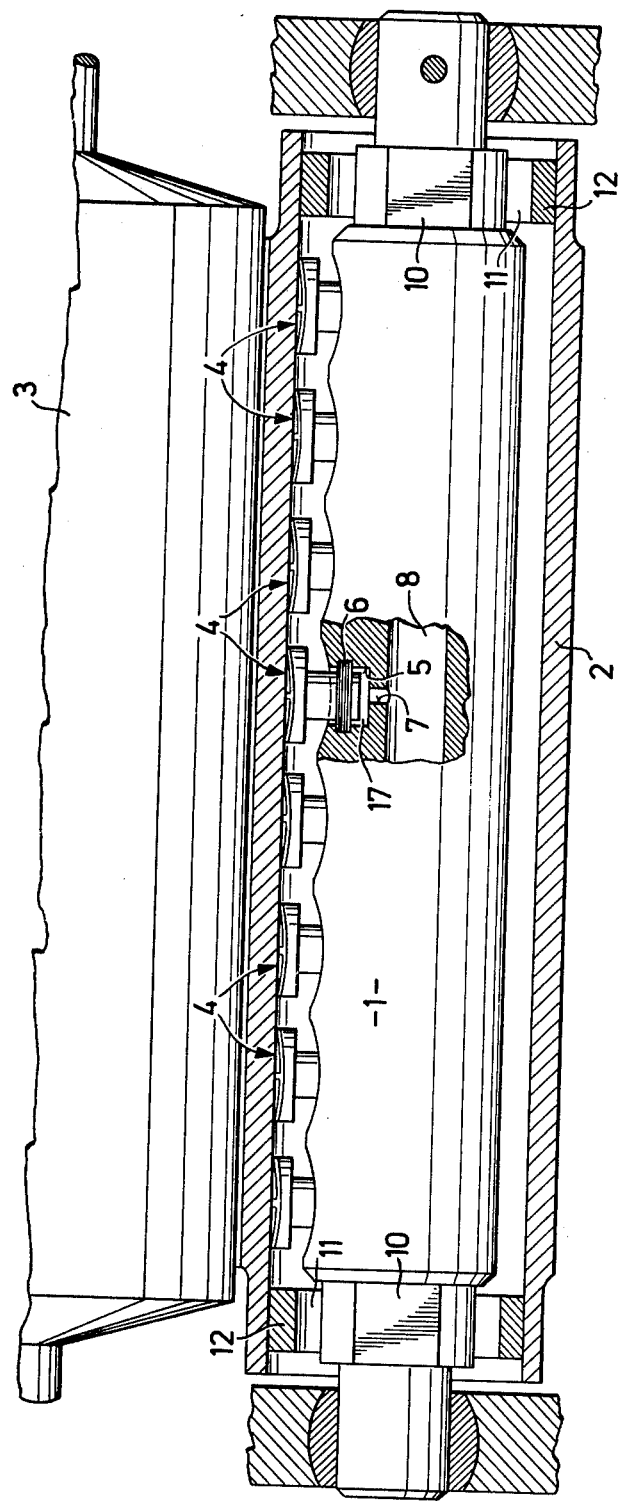
FIG. 1 is a sectional view of a controlled deflection roll according to the invention.

Referring now to the drawings, FIG. 1 shows a controlled deflection roll of the type described, for example, in U.S. Pat. No. 3,802,044. The roll comprises a stationary beam 1 about which is rotatably mounted a cylindrical roll shell 2. The roll shell cooperates with a mating roll 3, partially shown in FIG. 1, and is supported on hydrostatic support elements 4 which are in the form of pistons. The support elements 4 are tiltably guided in cylindrical bores 5 formed in the beam 1 with the intermediate space between the wall of the bore and the element 4 being sealed by a seal 6.

As shown in FIG. 1, the support elements 4 are disposed in a row along the length of the roll with their respective bores 5 connected by ducts 7 to a common pressure medium supply duct 8. The supply duct 8 is connected to a source (not shown) of pressure fluid, for example oil, located externally of the beam. Also as shown in FIG. 1, the ends of the beam may advantageously be provided with flat guide surfaces 10 which are guided in elongated slots 11 formed in guide discs 12 mounted within each end of the roll shell 2. Such an arrangement for mounting the roll shell, which is described in U.S. Pat. No. 3,885,283, permits the roll shell to move with respect to the beam 1 in the plane of the support elements 4.

Figure 2:
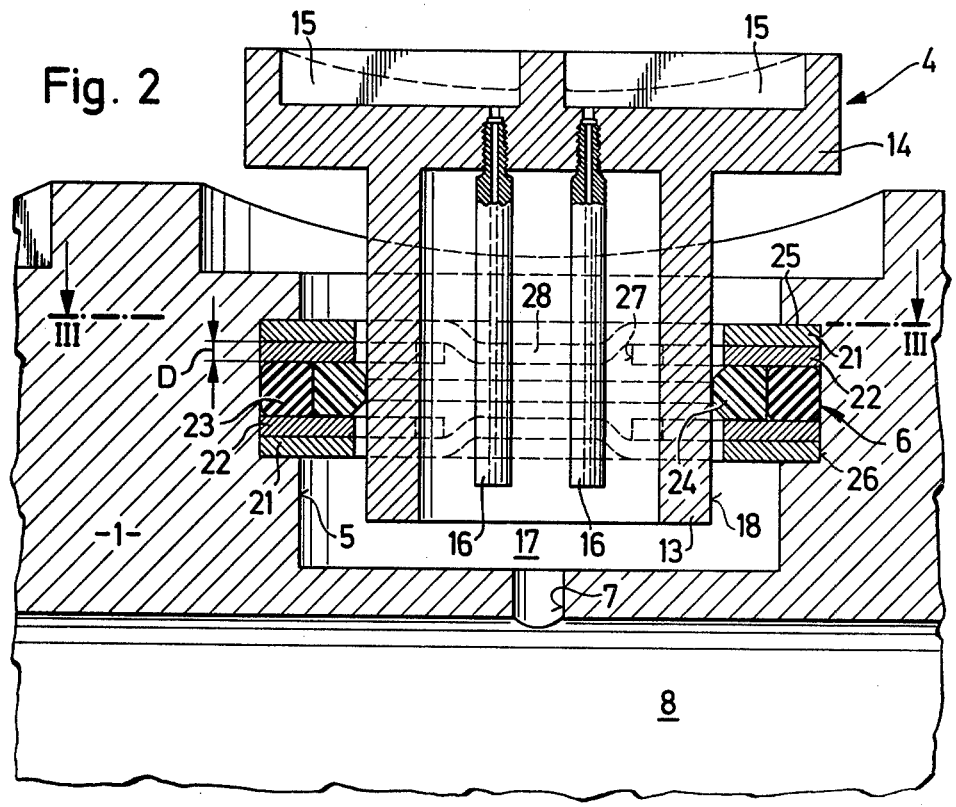
FIG. 2 is a detail of a portion of FIG. 1 to an enlarged scale showing a support element and a seal according to the invention.
Figure 3:
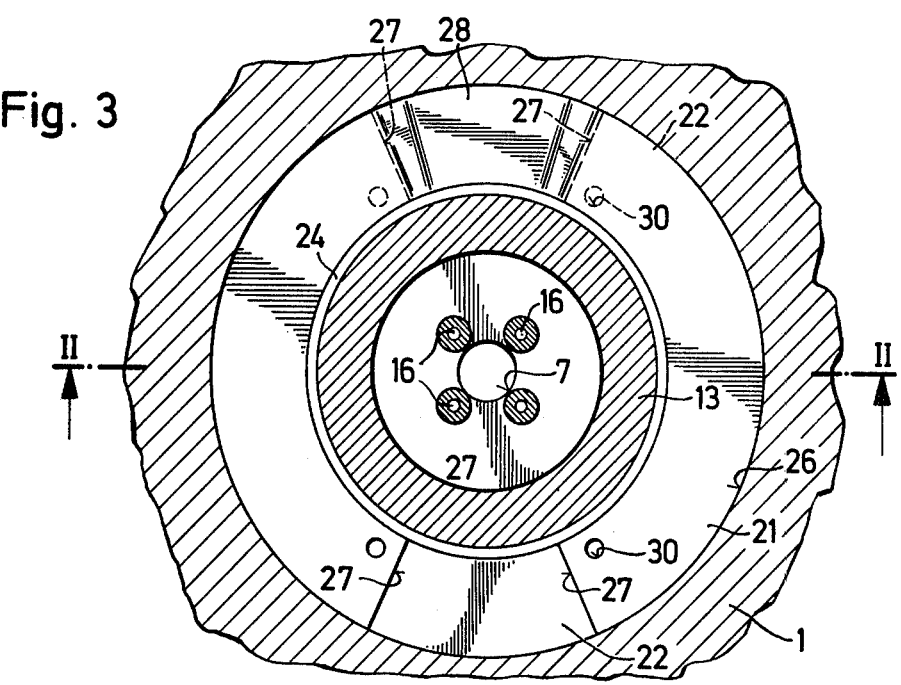
FIG. 3 is a fragmentary sectional view taken on line III—III of FIG. 2.

FIG. 2 shows in greater detail a portion of the support beam 1 and one of the support elements 4. The support element 4 has a cylindrical portion or piston 13 and a bearing shoe 14 of a larger area than the cross-sectional area of the piston 13 subjected to the pressure fluid in chamber 17. The piston 13 has a smooth cylindrical outer surface 18 which is engaged by a seal 6 disposed in a circumferential groove 26 formed in the wall of the bore 5. The bearing shoe 14 may be of the construction described in U.S. Pat. No. 3,802,044 and is provided with a plurality of hydrostatic bearing pockets 15 which are connected by throttle ducts 16 to the pressure chamber 17 of the cylindrical bore 5.

In the embodiments of the invention shown in FIGS. 2 to 5, the seal 6 comprises two pairs of support rings 21, 22 between which is disposed an O-ring 23, formed of an elastomeric material, which acts as a contact-pressure ring and an actual sealing ring 24 formed of a plastic having suitable frictional properties.

During operation, the pressure of the hydraulic fluid in the pressure chamber 17 may be relatively high, depending on the required roll contact-pressure force. The pressure fluid in chamber 17 acts on the piston 13 and forces the support element 4 outwadly and agianst the interior of the shell 2. At the same time, the hydraulic fluid is supplied to the hydrostatic bearing pockets 15 through the throttle ducts 16 and forms a fluid cushion between the bearing shoe 14 and the interior surface of shell 2, preventing any direct contact between the support element and the roll shell. Since any sag or deflection of the support beam 1, occurring during operation, results in an inclination of the support element 4 in the bore 5, the seal 6 projecting into the intermediate space between the piston 13 and the wall of the bore 5 is configured to permit the support element 4 to tilt with respect to the axis of the bore.

The seal 6 projecting into the bore is, however, also subjected to the pressure of the hydraulic fluid in the cylindrical chamber 17. The upward force exerted by the fluid on the sealing ring 24 is taken up by the two upper support rings 21 and 22 which are in turn supported by the upper shoulder 25 of the groove 26.

As shown in FIGS. 2 to 5, the rings 21 and 22 are each provided with a segmental cutout 27 which may be of the same size for each of the rings. The cutouts 27 permit the rings to be deformed during their introduction into the groove 26 of the bore 5. The two inner rings 22 which are in engagement with the O-ring 23 and the sealing ring 24 are flat. In order to provide a flat supporting surface in the region of the cutouts 27, the outer rings 21 are each provided with a projection 28 which is adapted to be introduced into the cutout 27 of the adjacent inner ring 22. The height of the projection 28 is the same as the thickness D of the inner ring 22 so that when the two rings are placed on each other, the projection 28 fits into the cutout 27 and provides a flat support surface for the sealing members 24 and 23. The rings 21 and 22 may also be provided with apertures 30 at their ends adjacent the cutouts 27 for engagement by a tool in the form of pliers by means of which the rings can be deformed during introduction into the groove 26.

Figure 6:
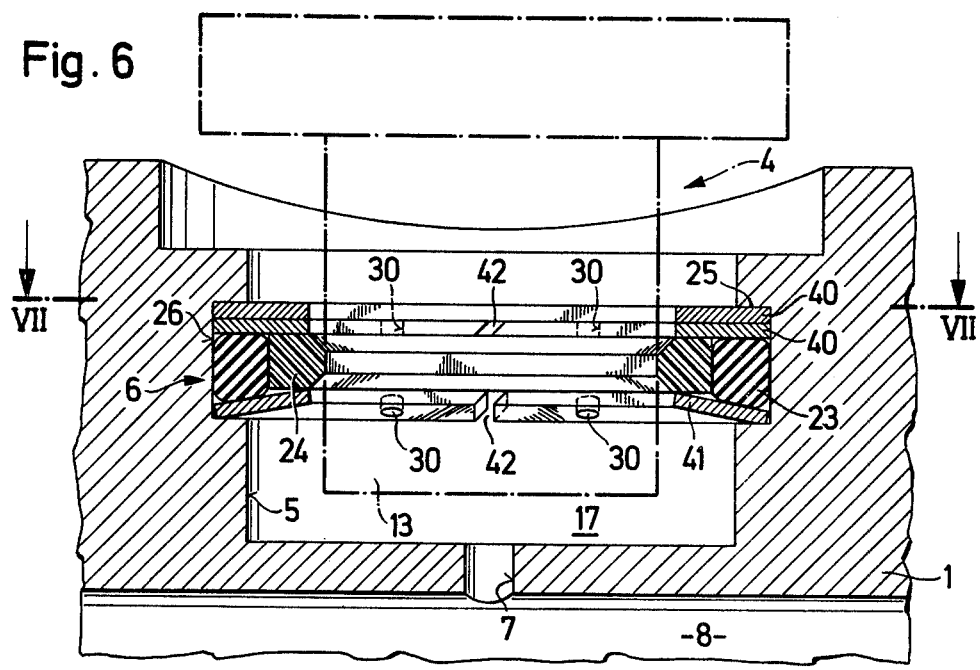
FIG. 6 is a fragmentary sectional view similar to FIG. 2 showing another embodiment of the invention.
Figure 7:
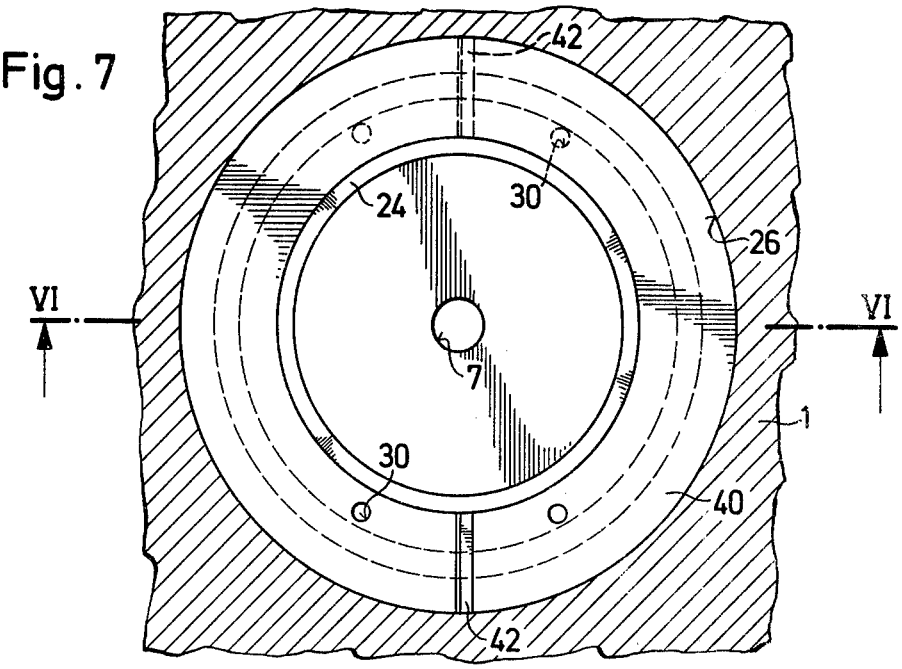
FIG. 7 is a fragmentary sectional view taken on line VII—VII of FIG. 6.

FIGS. 6 and 7 show another embodiment of the invention in which the construction of the seal is similar to that of the embodiment shown in FIGS. 2 to 5, except that rings 40 and 41 are used to support the sealing ring and O-ring in place of the support rings 21 and 22. The two upper suport rings 40 are both flat and each has a narrow radial slot 42. The rings 40 are positioned in groove 26, one on the other, and are oriented so that the slots 42 are diametrically opposite each other. This arrangement thus provides a very rigid support for the seal members 23 and 24.

Since in the embodiment shown in FIG. 6, the force exerted on the seal 6 by the hydraulic fluid in chamber 17 is taken up by the two upper rings 40 during operation, the bottom ring 41 is of a slightly conical construction so that its shape is similar to that of a cup spring. This arrangement compensates for any oversize of teh groove 26 with respect to the seal 6 and therefore the grooves can be made with less precision and hence more cheaply.

Figure 8:
FIG. 8 is a fragmentary sectional view of another embodiment of a resilient support ring of the invention.

FIG. 8 shows a corrugagted ring 41' which can be used in place of the frustoconical ring 41 in the embodiment of FIG. 6. Because of the axial corrugations, ring 41' is resilient in the axial direction of the bore 5 and hence can compensate for any variations in the tolerances of the groove in the same manner as the conically shaped ring 41.

The rings 40, 41, and 41' may also be provided with apertures 30 by means of which the ends of the ring may be engaged by a tool during the introduction of the rings into the groove.

Figure 9:
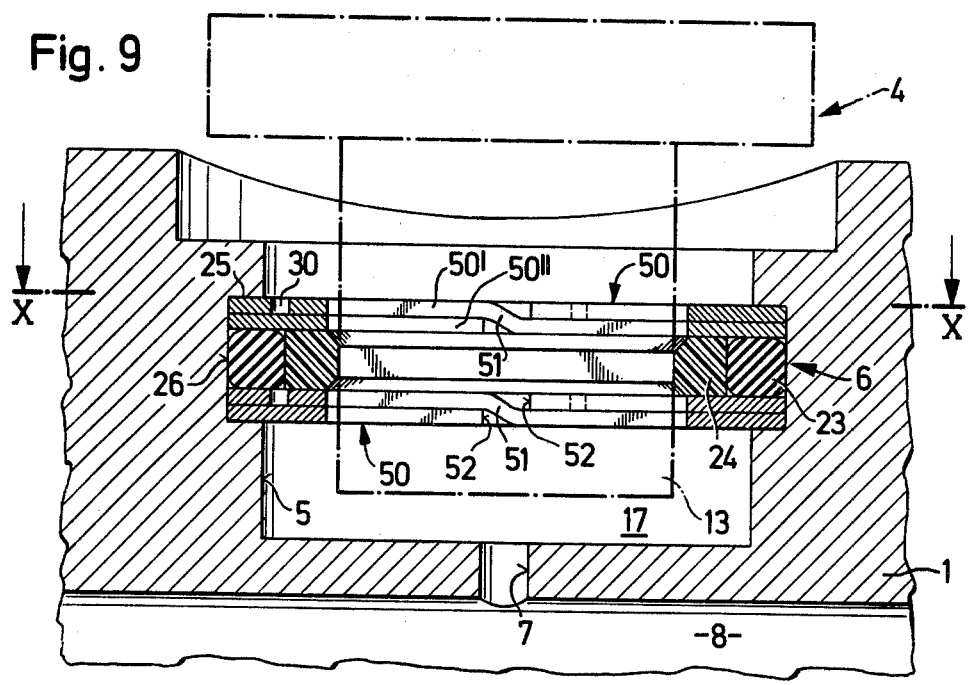
FIG. 9 is a fragmentary sectional view similar to FIG. 2 showing a further embodiment of the invention.
Figure 10:
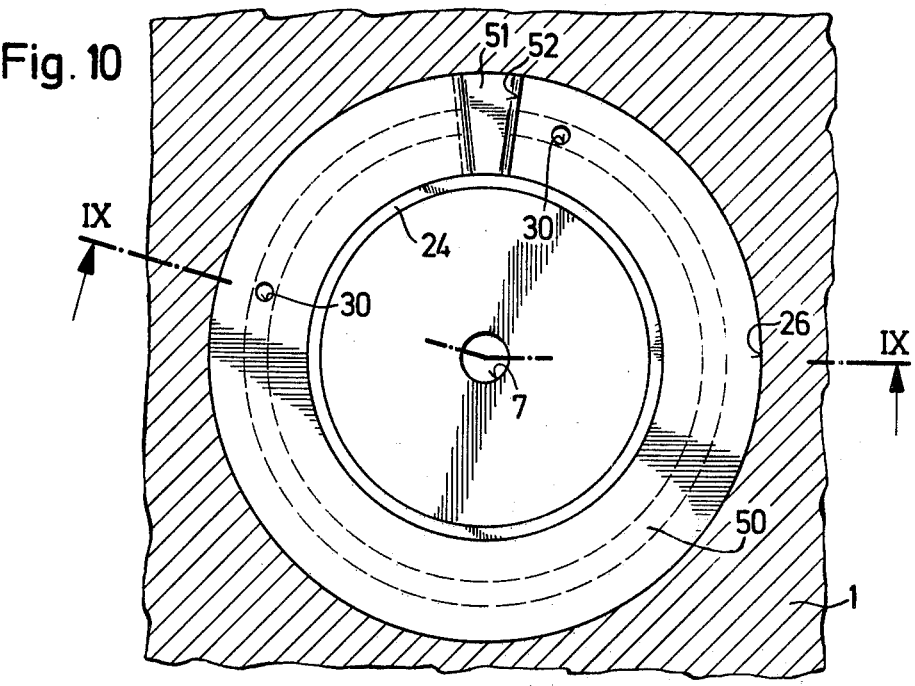
FIG. 10 is a sectional view taken on line X—X of FIG. 9.

In the embodiment shown in FIGS. 9 and 10, the support rings 50 are each in the form of a coil formed by two turns 50' and 50" of a flat metal strip. The two turns 50' and 50" lie flatly one upon the other and the step 51, formed by the transition from one turn to the next, is positioned in the gap between the two ends 52 of the ring 50 to provide a flat support surface for the seal members 23 and 24. The construction of the support ring 50 is thus similar to that of a key-ring.

I claim:

1. A deflection compensating roll which comprises a beam, a roll shell rotatably mounted about said beam, at least one fluid-actuated support element for exerting forces against the interior of said shell having a cylindrical portion tiltably guided within a cylindrical bore formed in said beam, and a bearing surface adjacent the interior of said shell, said cylindrical portion and the wall of said bore defining an intermediate space therebetween, means for introducing fluid under pressure into said bore, and means for sealing off said intermediate space while permitting said support element to tilt with respect to the axis of said bore upon deflection of said beam during operation, said sealing means positioned in a circumferential groove formed in the wall of said bore and including a sealing member in seal-tight engagement with said cylindrical portion of said support element, at least a pair of associated generally annular ring members disposed within said groove and extending at least partially into said intermediate space on at least one side of said sealing member, each ring member having a gap defined by a segmental cutout and at least one ring member of each pair having a diametrically opposed portion displaced out of the plane of the ring member and parallel thereto, said displaced portion extending over a circumferential distance of the ring member not greater than the circumferential distance of the gap defined by said segmental cutout of the associated ring member such that when the ring members are positioned in stacked relation, said displaced portion of said at least one ring member is positioned within the gap defined by the segmental cutout of the associated ring member for supporting at least one side of said sealing member against forces exerted by said fluid introduced into said bore.

2. A roll according to claim 1 including a plurality of said support elements each disposed in a respective cylindrical bore formed in said beam, said support elements each having a plurality of hydrostatic pockets formed in said bearing surface and at least two of said associated ring members are positioned on each side of said sealing member, and throttling ducts are provided for communicating said pockets with said fluid introduced into said bore.

3. A roll according to claim 1 wherein each ring member is formed of a metal material which is deformable for introduction of said ring member into said groove.

4. A roll according to claim 1 wherein said displaced portion of said at least one ring member of each pair has a height substantially equal to the thickness of the associated ring member.

5. A roll according to claim 1 further comprising at least one annular support member disposed within said groove on the opposite side of said sealing member and extending at least partially into said intermediate space between the wall of said bore and said cylindrical portion such that both sides of said sealing member are supported against forces exerted by said fluid introduced into said bore.

6. A deflection compensating roll which comprises a beam, a roll shell rotatably mounted about said beam, at least one fluid-actuated support element for exerting forces against the interior of said shell having a cylindrical portion tiltably guided within a cylindrical bore formed in said beam, and a bearing surface adjacent the interior of said shell, said cylindrical portion and the wall of said bore defining an intermediate space therebetween, means for introducing fluid under pressure into said bore, and means for sealing off said intermediate space while permitting said support element to tilt with respect to the axis of said bore upon deflection of said beam during operation, said sealing means positioned in a circumferential groove formed in the wall of said bore and having a sealing ring of plastic material in seal-tight engagement with said cylindrical portion of said support element and an elastomeric O-ring disposed within said groove between said sealing ring and the wall of said groove, at least a pair of associated ring members of metal material disposed within said groove and extending at least partially into said intermediate space on each side of said sealing ring, each ring member having a gap defined by a segmental cutout and at least one ring member of each pair having a diametrically opposed portion displaced out of the plane of the ring member and generally parallel thereto, said displaced portion having a height substantially equal to the thickness of the other ring member and extending over a circumferential distance of the metal ring member not greater than the circumferential distance of the gap defined by said segmental cutout of the associated ring member such that when a pair of associated metal ring members are positioned in stacked relation on each side of said sealing ring, said displaced portion of said at least one metal ring member is positioned within the space defined by the segmental cutout of the associated ring member for supporting both sides of said sealing ring against forces exerted by said fluid introduced into said bore.

* * * * *